Figure 1A:
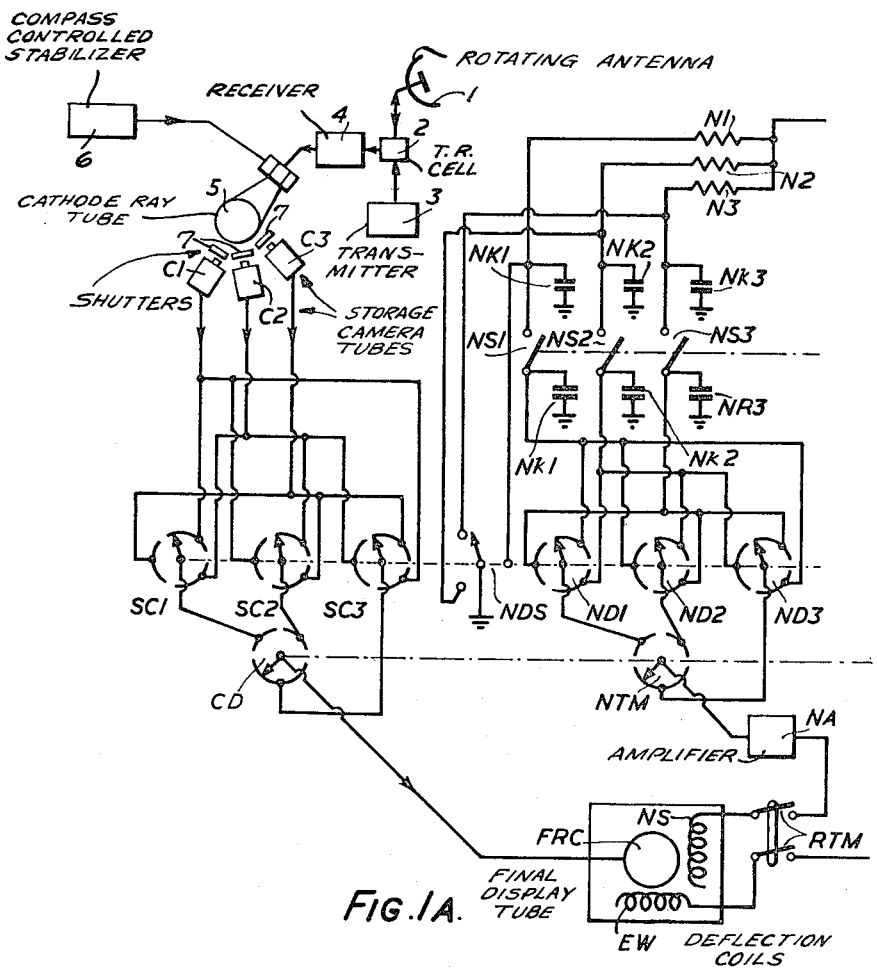

FIG. IB.

June 8, 1965 J. WATT 3,188,633
RADAR SYSTEMS
Filed April 16, 1962 3 Sheets—Sheet 3

INVENTOR
James Watt
BY Baldwin & Wight
ATTORNEYS

United States Patent Office 3,188,633
Patented June 8, 1965

3,188,633
RADAR SYSTEMS
James Watt, Chelmsford, England, assignor to The Marconi Company Limited, London, England, a British company
Filed Apr. 6, 1962, Ser. No. 187,479
Claims priority, application Great Britain, Apr. 18, 1961, 13,945/61
7 Claims. (Cl. 343—11)

This invention relates to radar systems and though not limited exclusively to its application thereto, is primarily intended for marine radar systems.

The problem of designing a marine radar system which will give a watch-keeping officer, reliably and quickly, the information necessary for safe navigation in conditions of heavy traffic and bad visibility has not yet been satisfactorily solved despite the different varieties of P.P.I. displays which have been proposed and used. Safe navigation involves that, before taking any avoiding action, the officer shall know whether danger of collision exists and whether, under the Regulations for Preventing Collisions at Sea, it is his duty to take such action. Since, under the Regulations, risk of collision is deemed to exist if the compass bearing of an approaching vessel does not appreciably change, the officer must be provided with information of the movements of the ships concerned over the period of time necessary to determine whether or not there is appreciable change of compass bearing and, accordingly, whether it is his duty to maintain his course and speed or to take avoiding action. In the radar systems at present in general use it is sought to satisfy these requirements by presenting a P.P.I. type of display on a cathode ray tube having a screen with long afterglow effects so that the display shows not only the momentary target positions but also, due to the said afterglow effects, "past history" i.e. previous target positions occupied during the period of afterglow. This dependence on afterglow has serious practical defects. In practice the brightness of the parts of the display actually being "written in" at any time is much greater than the parts which persist by afterglow effects and the latter parts are, in general, too dim for convenient accurate use except (and not always then) under conditions of almost total ambient darkness. For this and other reasons it is common practice, and, indeed, normally necessary to safe navigation, to resort to manual plotting of observations made of the display screen at intervals and many radar equipments include a so-called "reflection plotter" fitted over the display tube to facilitate such plotting. The need for manual plotting constitutes a serious disadvantage not only because of the fact that it requires skilled man-power, but also because an undesirably long time must elapse before a plot of sufficient length reliably to give the required information can be obtained. Also, the number of ships which can be simultaneously plotted by an officer using a simple display as his source of information is, for obvious practical reasons, severely limited, and an officer will, therefore, necessarily confine his attention to those ships constituting the most imminent threats to safe navigation. This can be a serious cause of danger in conditions of heavy traffic. Furthermore, in the case of known P.P.I. displays of the so-called true motion type, i.e. the type in which "own ship" representation appears in different positions on the screen corresponding to different positions occupied by the ship in moving—"own ship" representation moves towards the screen edge so that it may be necessary to commence plotting another ship when the "own ship" representation is approaching the edge of the display with the result that a plotting operation may have to be stopped or interrupted when the display is reset, or, alternatively, it may become necessary to reset the display before commencing a plot.

Another defect of the usual known radar systems with only a single display tube is that it is impossible, as it is often required to do, to change over quickly from a so-called relative motion display with "past history" in it to a true motion display with "past history" in it, (i.e. from a display with "own ship" at the centre to a display in which "own ship" moves across the tube screen in accordance with ship movement) or vice versa because, when the tube is switched over from one display to the other, it takes some time before the new display, with "past history" in it, is built up. Of course, this defect could be avoided by having two tubes in continuous use, one giving a relative motion display and the other a true motion display, but it is obviously not desirable to have two tubes to watch, quite apart from the extra cost involved in providing two tubes with their associated gear, and the considerable danger of the observer drawing wrong conclusions regarding ship movements due to his mistakenly attaching in his mind the relative movement of one ship to the true motion of another.

The present invention seeks to avoid the foregoing difficulties and disadvantages.

According to a feature of this invention a radar system suitable for marine use comprises means for deriving at a predetermined relatively low periodicity, a succession of sets of information, each set being of information as to the direction and distance of radio reflecting targets within the range of the system; a plurality of storage means; means for cyclically storing a sequence of said derived sets in said storage means with a different sequential set in each; means for taking off, at a cyclic speed of repetition which is high relative to the aforementioned low periodicity, the sets of information stored at any given time in said storage means; and means for utilising the sets of information taken off to produce a final display of the P.P.I. type.

Preferably the derived sets of information are of information as to the compass direction and distance of radio reflecting objects.

Preferably again signal storing means are provided for storing, during the deriving of the succession of sets of information, signals representative of the amount and direction of movement of the radar system as whole during the time taken to derive said succession of sets, and further means, preferably operable at will, are provided for utilising said stored signals to deflect the origin of the P.P.I. display of each set of information in said final display on the surface on which said display is produced by an amount representative of the amount of and in a direction opposite to the direction of said movement of the radar system as a whole during the time elapsing between the deriving of the set in question and deriving of the last set to be derived whereby the final display is caused to be a true motion display with, however, the last position (at any time) of the radar system as a whole always at the centre of the surface on which the final display is produced. Thus the final display, though showing true motion, is not one in which the radar system position creeps towards the edge of the display surface and no re-setting is therefore required.

According to another feature of this invention a radar system suitable for marine use includes means for producing, on the screen of a display cathode ray tube, a reversed true motion display comprising a plurality of P.P.I. (plan position indicator) pictures each of information obtained during a different space scanning operation of the radar system, the origin of the picture of information obtained in the last space scanning operation being at a fixed predetermined point (normally the centre point)

on said screen and the origin of each of the other pictures displayed at any given time being spaced from said point by an amount corresponding to and in a direction opposite to the movement of the radar system during the time interval between the two scanning operations considered.

The periodicity at which the succession of sets of information is derived is very much longer than that at which the stored sets are taken off and displayed. Thus, to quote practical figures for a marine equipment of the usual kind in which a single azimuth exploration of 360° is effected in 3 seconds, thus providing a set of information in three seconds, each twentieth set might be stored, successive twentieth sets being stored in different storage means, so that a succession of sets is stored at a periodicity of one per minute, and the sets stored at any given time in all the storage means might be taken off in sequence and displayed in a cyclic time of, say, 2½ seconds, i.e. all the stored sets would be taken off and displayed in 2½ seconds.

It is not necessary that the time during which stored sets of information are taken off from the plurality of storage means is not the same for all the individual storage means. Indeed, it is preferred to spend a longer time in taking from and displaying a set of information stored in that storage means storing the most recently derived set than in taking from and displaying the sets of information stored in the other storage means. Thus, to quote a preferred and practical embodiment, there may be three storage means employed to store three sets of information derived during three successive periods of time (e.g. during the three seconds at the beginning of three successive periods of one minute each) and approximately half the complete cycle of time (e.g. 2½ secs.) during which the stored sets of information are taken off from the said three storage means may be occupied in taking off information from the storage means storing the latest of said sets, approximately one quarter of the said complete cycle of time being occupied in taking off information from each of the other two storage means. Such an arrangement has the advantage that, in the resultant display, the last set of information to be derived and stored will be displayed more persistently than earlier derived and stored sets, and hence more prominently.

In one way of carrying out the invention the sets of information are derived by means of an azimuth scanning aerial, a pulsed radar transmitter, an echo signal receiver, what is herein termed an "intermediate" P.P.I. display tube of little or no afterglow, the ray in which is deflected radially under the control of a range time base and circularly at the speed of aerial scanning in azimuth (as so far described the apparatus is as known and, except that the intermediate display tube has little or no afterglow, like that of a normal known radar system); a periodic succession of selected sets of information occurring at predetermined relatively long intervals—i.e. a chosen periodic succession (e.g. one in twenty) of the successive displays of the tube produced during successive scans in azimuth—are stored by means including a plurality of camera tubes focused on and successively exposed each to a different one of the selected pictures produced on the screen of the intermediate display tube; and signals from the camera tubes are fed, at a speed of repetition which is high relative to the low periodicity of storage, to a final display tube adapted and arranged to produce a P.P.I. display. The camera tubes may themselves effect storage of signals or separate storage means for storing sets of signals produced by the camera tubes may be used. In this embodiment the P.P.I. display in the intermediate display tube will (in accordance with normal radar position) be produced in polar co-ordinates by a polar co-ordinate scan—i.e. by radial and circular deflections. It is preferred, however, that the P.P.I. display in the final display tube be produced by a television scan, i.e. as a picture built up by a series of scanning lines as in a television reproducer picture tube, the display still being of P.P.I. type (within the meaning of that expression as employed in this specification) i.e. still being of the type in which the distance and direction of a target representation from the origin of the display correspond respectively to the range and compass direction of the target represented thereby. There are various ways in which a final display of what may be termed the "television P.P.I." type may be obtained. One way is to use camera tubes of the storage type and scan the storage target structures thereof to pick-up signals therefrom in accordance with a television line raster. However, in order to avoid problems of accurate registration with three storage type camera tubes, it may be found more convenient to separate the functions of scan conversion and storage. Thus, for example, the signals from only a single master camera tube performing the operation of scan conversion could be fed via a distributor switch to three storage devices of the magnetic drum type. Of course, scan conversion is not a necessity to the invention (though it is preferred) and the apparatus may be such as to store sets of information in polar co-ordinates and also to take them off and display them in polar co-ordinates.

If it is required to produce, either all the time or at will, a final display of the true motion type, there may be provided means for producing D.C. signals representative of mutually perpendicular components (e.g. North-South and East-West) of ship's motion, storage condensers for storing said components, and means (which may be operable at will) for utilising signals stored in said condensers for shifting the origin of the display in the final display tube in corresponding perpendicular component directions of such sense that the origin of the display of the last derived stored set of information is always at the centre of the screen, but the origins of the displays of earlier derived sets are moved back in correspondence with ship's movements which have occurred since the deriving of said earlier derived sets and prior to the deriving of said last derived set. In this way, the very advantageous result is obtained that, although a display of the true motion type is obtained, it differs from a true motion display as obtained by present commonly used radar systems in that it does not "creep" towards the screen edge and therefore never requires re-setting. A further advantage is that the successive last sets of information, which are most persistently and prominently displayed in the final display, show relative motions of radio reflecting targets simultaneously with a display of true motion.

It is not necessary to take off and display the sets of information cyclically in order to produce a final true motion display for obviously this result can be achieved if they be taken off and displayed (in said final display) simultaneously and this may be done, for example, in the last part of the 2½ second cycle of taking off and displaying hereinbefore mentioned. With such an arrangement there is obtained, on a single display surface, a speeded-up true motion display of reflecting targets, an emphasised display of their last positions, and an early observed display of their motions relative to the radar system and such an arrangement will be more fully described later with reference to FIG. 3 of the drawing accompanying the complete specification.

Figure 3:
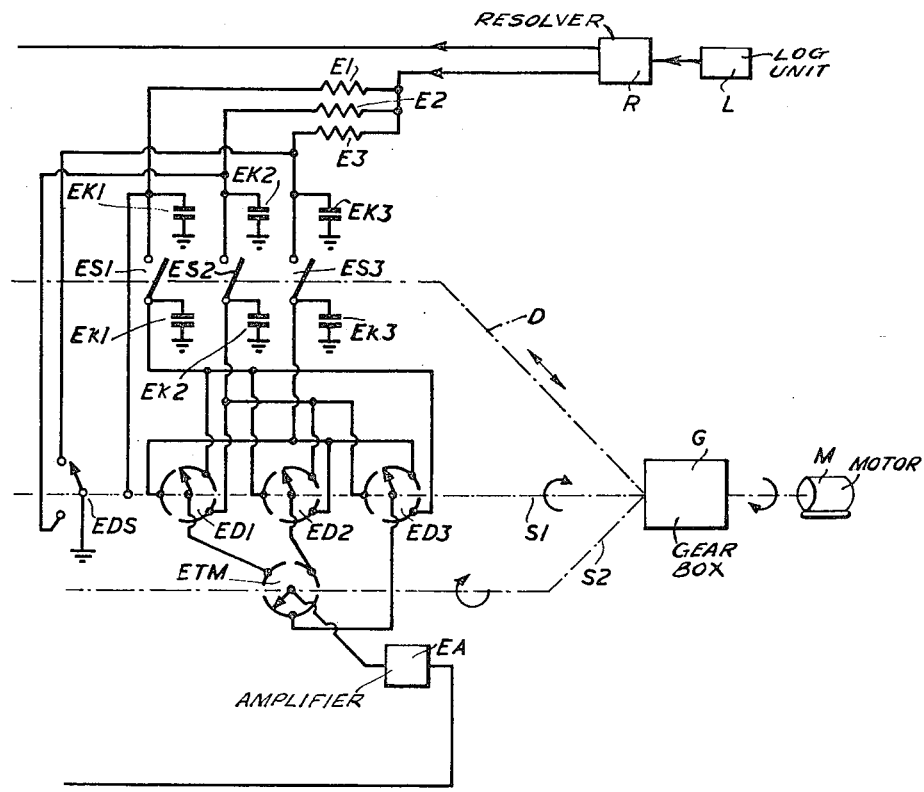
Figure 3:
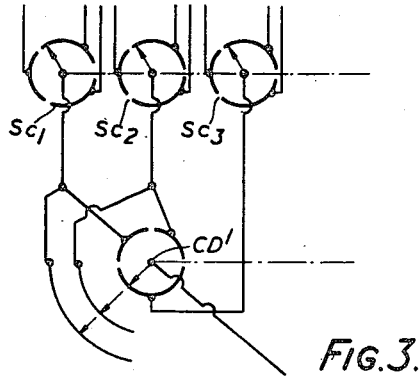
Figure 2:
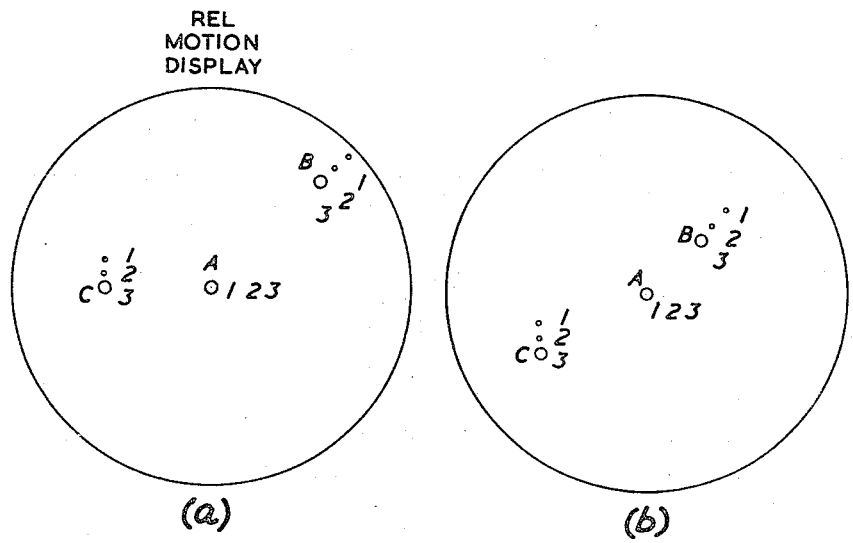
Figure 2:
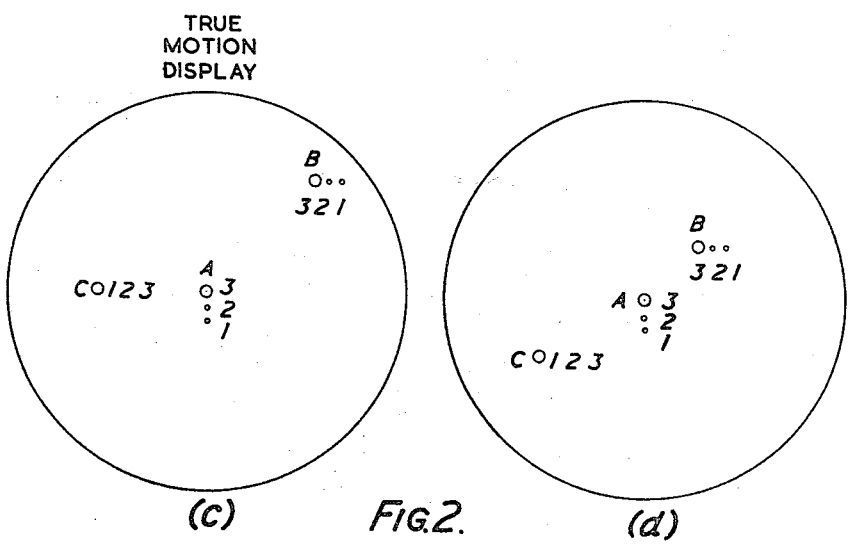

The invention is illustrated in the accompanying drawings. It the drawings the figures are numbered consecutively. FIGURE 1 shows schematically and in simplified diagrammatic manner a ship-borne embodiment by means of which there may be produced, at will, either a true motion display or a display in which "own ship" appears fixed at the screen centre of the final display tube; FIGURE 2 is a set of representations showing, diagrammatically, the nature of the displays obtainable from an equipment as illustrated in FIGURE 1; and FIGURE 3 shows, so far as is necessary to an understanding thereof, a modification.

Referring to FIGURE 1, a rotating azimuth scanning aerial system 1 rotated, for example, at 20 r.p.m. by a suitable motor drive (not shown) transmits radio pulses and receives reflected echo pulses, the transmitted pulses being fed to the aerial system via a T-R cell 2 from a transmitter 3 and the received echo pulses being fed via said cell to a receiver 4. Output signals from the receiver 4 are fed as "brighten-up" signals to what is herein termed the intermediate display cathode ray tube 5, the screen of which has little or no afterglow. The ray in the tube 5 is subjected to radial deflection by a so-called range time base and also to circular deflection at the same speed as the rotation of the aerial system 1 so that it produces a display of the P.P.I type. Any suitable known means 6, controlled by the ship's gyro compass, are provided for compass stabilising the display on tube 5 so that the most forward point of the display always corresponds to North direction. The means for deflecting the ray in the tube 5 are as well known and are accordingly not shown in FIGURE 11. In fact the equipment as so far mentioned is that of a normal well known radar system giving a "North-up" compass stabilised P.P.I. display and therefore requires no further description, its only difference from present day common practice lying in the fact that the tube 5 is one having little or no afterglow instead of being (as would be the case in a normal known equipment) a tube with a long afterglow screen.

Focused on the display produced on the screen of the tube 5 are three storage type camera tubes C1, C2, C3 of the Permachon or similar type having a storage electrode structure which is scanned in television line fashion at suitable line and frame frequencies by a "pick-up" cathode ray to develop output signals corresponding to the stored signals. Such camera tubes are well known and, as will be understood, each will give output signals which, if fed to a television reproducer tube having a cathode ray deflected in synchronism with the pick-up ray in the camera tube, would cause said tube to reproduce, in television fashion, the pictures on the screen of the tube 5 at whatever is the chosen frame frequency, e.g. 50 frames per second. In other words the cameras C1, C2 and C3 view the screen of the tube 5 and produce television type output signals corresponding thereto. The three camera tubes C1, C2 and C3 are exposed successively (by means such as the three shutters 7, one for each camera tube, shown diagrammatically in FIGURE 1) at one minute intervals to one complete P.P.I scan (lasting approximately 3 seconds) on the screen of tube 5, each camera tube holding its own information for a period of three minutes at the end of which its stored signals are erased and a new picture stored. The means for controlling the shutters 7 and the signal erasing means in an appropriate manner, being known to those skilled in the art, are not illustrated separately, being presumed to be incorporated in the representations C1, C2 and C3.

The signal outputs from the tubes C1, C2 and C3 are fed to the stators of three collector switches SC1, SC2, SC3. Each of these switches has a rotor arm rotating round a stator consisting of three arcuate contacts which are insulated from one another and each of which subtends an arc of a little less than 120°. As will be clear from FIGURE 1, each of the camera tubes C1, C2, C3 feeds its output to three of the arcuate contacts, one in each switch, the three contacts fed from any one camera tube being at 120° to one another and the three contacts of any switch being fed from a different camera tube. The three rotor arms of the switches SC1, SC2 and SC3 are rotated together by a shaft S1 represented by a chain line (all mechanical drives are represented by chain lines in FIGURE 1) at one revolution in 3 minutes. The drive to the shaft S1 is shown as provided via a gearbox G by a motor M which is synchronised to run at a suitable fixed speed relation with the motor (not shown) which rotates the aerial. In fact, if desired, the same motor which rotates the aerial may be used to provide power for all the mechanical drives required.

The three rotor arms of the switches SC1, SC2 and SC3 are connected to the three insulated arcuate stator contacts of a further collector switch CD. Although the stator contacts of this switch may be of equal angular extent, like those of the switches SC1, SC2, and SC3, it is preferred to make them as shown, with two of them each subtending a trifle less than 90° and the third subtending a trifle less than 180°. The switch CD is driven at relative high speed, e.g. 1 revolution in 2½ secs. from the gearbox G by a shaft S2. As will be apparent the arrangement of the collector switches SC1, SC2, SC3 and CD is such that, during any one minute (the time between the deriving of successive selected sets of information to be stored) the rotors of the switches SC1, SC2 and SC3 will be feeding to the three different stator contacts of the switch CD, television signals corresponding to pictures produced on the screen of the tube 5 at the commencements of the last three successive one minute periods, and in each 2½ secs. the rotor of switch CD will take off in succession from the three stator contacts the three signals corresponding to the three pictures, two of which display data respectively 2 minutes and 1 minute earlier in time than that displayed by the third. The long stator contact—the approximately 180° contact—of switch CD is the one connected to the camera tube (the tube C3 of FIGURE 1 during the particular one minute phase of the three minute cycle chosen for illustration) which is at the time considered televising the latest picture. The signals on the rotor of switch CD are fed as brighten-up signals to the final reproducer cathode ray tube FRC, the ray in which is subjected to television type line and frame deflection (by means not separately shown) in synchronism with the corresponding deflection of the pick-up rays in the camera tubes C1, C2, C3.

The nature of the display by the final tube FRC given by the apparatus of FIGURE 1 as so far described is indicated by diagrams (a) and (b) of FIGURE 2 which are displays separated by a four minute interval for a case in which "own ship" is steaming North. In both diagrams the large spot A represents "own ship" and is fixed at the centre of the screen. In both figures the large spot B with the numeral 3 nearby, represents the last relative position of another ship steaming West at the same speed as "own ship" and the small spots 2 and 1 near the said large spot represent that ship's relative positions one minute and two minutes (respectively) earlier. As will be seen the other ship has a constant bearing of 045°. Each of the two pictures (a) and (b) shows at a glance that the two ships are on a collision course and that "own ship" has the duty of keeping clear. The large spot C with 3 nearby is the last relative position of a fixed object, such as a buoy, the adjacent small spots 2 and 1 showing its relative positions one and two minutes earlier. Not the least of the advantages of the display given is that it gives an effect of accelerated motion i.e. although the display at any instant shows what has occurred in two minutes, motion in the display is clearly discernable because it has been speeded up by a substantial factor—in the particular installation described and illustrated by a factor of $$\frac{60}{\frac{1}{24} \times 2\frac{1}{2}} = 96$$

The displays of (a) and (b) of FIGURE 2 are relative motion displays. If desired, the invention may be used to give true motion final displays either permanently or at will. The remainder of the apparatus of FIGURE 1, now to be described, will transform a relative motion display into a true motion display.

Referring again to FIGURE 1, L is a so-called log unit as known per se and adapted to give a D.C. voltage proportional to ship's speed. This output is fed to a compass controlled resolver R, also as known per se, and adapted to resolve the signal from L into two vectorially perpendicular components, one of which will be proportional to ship's component speed North along a meridian and the other proportional to ship's component speed East along a parallel of latitude. If desired means (not shown) and as well known per se may be provided for "inserting" estimated tidal or current speed so that the two components obtained take estimated drift into account. The meridian component is fed over three resistors N1, N2, N3 to three condensers NK1, NK2, NK3 which are accordingly charged at a rate proportional to the ship's speed component (which may, of course, be of either sign) along a meridian. Similarly the parallel of latitude component (which may also be of either sign) is fed through resistances E1, E2, E3 to charge three condensers EK1, EK2, EK3 at a rate proportional to the ship's speed component along a parallel of latitude. Switches NS1, NS2, NS3 and ES1, ES2 and ES3 are closed for a short period of, say, 1 second at the commencement of each 1 minute period, the closure being effected by a suitable mechanical drive D actuated by a cam or like mechanism (not separately shown) incorporated in the gearbox G. The switches, when closed, connect the condensers NK1, NK2, NK3, EK1, EK2, EK3 to charge smaller condensers N$k$1, N$k$2, N$k$3, E$k$1, E$k$2, E$k$3 respectively—small enough to charge up without seriously affecting the charges in the larger condensers from which they are charged. The larger condensers NK1, NK2, and NK3 are successively discharged, at the commencement of 1 minute intervals, by a three contact switch NDS whose rotor is driven by the shaft S1 while the condensers EK1, EK2 and EK3 are similarly successively discharged by the switch EDS driven by the shaft S1.

The live sides of the small condensers N$k$1, N$k$2 and N$k$3 are connected to the stator contacts of three collector switches ND1, ND2 and ND3 which are like the switches SC1, SC2 and SC3 and are driven by the same shaft S1. Each of these condensers is connected to three contacts at 120° one on each of the switches ND1, ND2, ND3 and each of the three contacts of any one of these switches is connected to a different one of the three small condensers. The small condensers E$k$1, E$k$2 and E$k$3 are similarly connected with three collector switches ED1, ED2 and ED3 also driven by shaft S1.

The rotors of the three switches ND1, ND2 and ND3 are connected to the stator contacts of a collector switch NTM while those of the switches ED1, ED2 and ED3 are connected to the stator contacts of a collector switch ETM. These two switches NTM and ETM have each one large contact and two smaller ones and are like the switch CD and are driven by the same shaft S2. Their rotors are connected to the input sides of identical amplifiers NA and EA whose outputs are fed, via the two poles of a double pole switch RTM (when closed) to N-S and E-W deflection shift coils schematically represented at NS and EW and associated with the final display tube FRC. These coils are indicated as separate coils but they may, of course, be the normally provided mutually perpendicular line and frame deflection coils of the tube. The sense of the windings is such that, when own ship has a positive (northerly) component of meridian velocity averaged over the interval between the deriving of any displayed earlier set of information and the deriving of the last set of information, the N-S deflection shift coils apply a southerly shift to the display of said earlier set of stored information. Similarly, a positive (easterly) component of averaged velocity along a parallel produces a westerly shift.

With this arrangement, when the switch RTM is closed, the deflection shift coils will receive inputs representative of ship's motion in successive minutes and a true motion display will be obtained. The nature of the display is represented in diagrams (c) and (d) of FIGURE 2 which correspond respectively to the relative motion displays of diagrams (a) and (b). As will be apparent, "own ship" appears moving N across the screen, the other ship appears moving W, and the buoy appears fixed. Bearings measured between dots for the other ship and the corresponding dots for "own ship"—dot 1 from 1, 2 from 2 and 3 from 3—show at once that a collision course exists. In all diagrams of FIGURE 2, the last position dots (3) at A, B and C are more prolonged than the earlier position dots (indicated by showing the dots larger) in each 2½ sec. cycle because, in switches CD, NTM and ETM one stator contact is larger than the other two. The emphasis thus placed on the last position dots is of considerable operating advantage in practice. Also it will be seen that, in all four diagrams included in FIG. 2, the last positions of own ship (represented by dot A3) is always at the centre of the tube screen.

As already stated it is not necessary, in order to obtain a true motion final display, to take off and display the sets of information cyclically for it can be done simultaneously. FIG. 3 shows how the arrangement of FIG. 1 may be modified to accomplish this. FIG. 3 shows only the switches SC1, SC2 and SC3 of FIG. 1 and a switch CD' which replaces the switch CD of FIG. 1. The rest of the arrangement illustrated by FIG. 3 is not shown because it is the same as in FIG. 1. As will be apparent the switch CD' of FIG. 3 differs from the switch CD of FIG. 1 in having two additional contacts each embracing a little less than 90° and spanning the second half of the long approximately 180° contact. One of these extra contacts is connected to the rotor arm of SC1 and the other is connected to the rotor arm of SC2. The rotor arm of CD' has contacts sweeping over the various stator contacts as conventionally indicated. The result is to add a fourth phase to the 2½ second cycle of rotation of CD', NTM and ETM in which the information stored in C1, C2 and C3 is taken off and displayed simultaneously. Since, during this phase, there is no shift applied to FRC due to own ship's motion, the "tracks" built up of the motions of target from the combined signal being delivered from all the informatioon stores via CD are representative of relative tracks and are easily distinguishable from the corresponding "stepping" true motion tracks.

The invention is obviously capable of wide modification. Thus, for example, the number of stores of target information and the number of stores of North and East motions of own ship (three in the case illustrated) do not need to be the same as the numbers of stores from which target information and motion signals are taken off and displayed cyclically in each sequence of display. The number of stores must be at least two, is preferably not less than three, and may be more than three in cases in which it is important that the last stores of information should be brought up to date at as short intervals as possible. Preferably the number of stores of each type is equal to or a whole multiple of the number of stores of each type from which information and signals are taken off and displayed cyclically. Thus the system of FIG. 1 could be extended to include twelve stores of each type, every fifth set of information being stored at intervals of 15 seconds instead of every twentieth set at intervals of 1 minute, the number of stator contacts on each of switches on shaft S1 being, of course, correspondingly increased to twelve. Moreover, the time taken by the total switching cycle—3 minutes in the case described with reference to FIGURE 1—need not be constant but could be arranged to be increased for increased ranges for the purpose of obtaining displayed target tracks of useful length in the case of targets which, being at long range, give rise to target dots which move only slowly across the intermediate tube display screen. Various expedients as known per se in radar practice could be adopted if required. This, for example, a mechanical drive from the ship's gyro compass to the deflection coil assembly (including both scanning raster coils and true motion shift coils) on the final display tube could be provided for the purpose of maintaining North on the tube screen in alignment with Compass North and ship's head on said screen in alignment with actual ship's head.

I claim:

1. A radar system suitable for marine use and comprising means for deriving, at a predetermined low periodicity, a succession of sets of information, each set being of information as to the direction and distance of radio reflecting targets within the range of the system; a plurality of information storage means; means for cyclically storing a sequence of said derived sets in said information storage means with a different sequential set stored in each storage means; means for taking off, at a relatively high cyclic speed of repetition which is high relative to the first-mentioned low periodicity, the sets of information stored at any given time in said information storage means; signal storing means for storing, during the deriving of the succession of sets of information, signals representative of the amount and direction of movement of the radar system as a whole during the time taken to derive said succession of sets, means for utilizing the sets of information taken off to produce a final display of the P.P.I. type, and further means for utilizing the stored movement representing signals to deflect the origin of the P.P.I. display of each set of information in said final display on the surface on which said final display is produced by an amount representative of the amount of and in a direction opposite to the direction of said movement of the radar system as a whole during the time elapsing between the deriving of the set in question and the deriving of the last set to be derived so that the final display is a true motion display in which the last position, at any time, of the radar system as a whole is always located at a predetermined position on the surface on which the final display is produced.

2. A radar system as claimed in claim 1 wherein the time during which stored sets of information are taken off from the plurality of information storage means is not the same for each information storage means, the time occupied in taking off from and displaying a set of information stored in that information storage means storing the most recently derived set being longer than the time occupied in taking off from and displaying a set of information stored in any other information storage means.

3. A radar system as claimed in claim 2 wherein there are three information storage means employed to store three sets of information derived during three successive periods of time and approximately one half the complete cycle of time during which the stored sets of information are taken off from the said three storage means is occupied in taking off information from the storage means storing the latest of said sets.

4. A radar system as claimed in claim 1, wherein said information deriving means comprising an azimuth scanning aerial, a pulsed radar transmitter, an echo signal receiver, an "intermediate" P.P.I. display tube of little or no afterglow, the ray in which is deflected radially under the control of a range time base and circularly at the speed of aerial scanning in azimuth, and means for compass-stabilising the said intermediate P.P.I. display; wherein a periodic succession of selected sets of information occurring at predetermined long intervals are stored by said information storage means which include a plurality of camera tubes focused on the successively exposed each to a different one of the selected pictures produced on the screen of the intermediate display tube; and wherein signals from the camera tubes are fed at a predetermined high speed of repetition to said information utilizing means which comprises a final display tube adapted and arranged to produce the P.P.I. final display.

5. A radar system as claimed in claim 4 wherein the P.P.I. display in the final display tube is produced by a television scan.

6. A radar system suitable for marine use and comprising means for deriving, at a predetermined low periodicity, a succession of sets of information, each set being of information as to the direction and distance of radio reflecting targets within the range of the system; a plurality of information storage means; means for cyclically storing a sequence of said derived sets in said information storage means with a different sequential set stored in each storage means; means for taking off, at a cyclic speed of repetition which is high relative to the first-mentioned low periodicity, the sets of information stored at any given time in said information storage means; signal storing means for storing, during the deriving of the succession of sets of information, signals representative of the amount and direction of movement of the radar system as a whole during the time taken to derive said succession of sets; and means including a final display cathode ray tube for combining said sets of information taken off and the stored movement representing signals to produce a reversed true motion display on the screen of said final display tube, wherein said reversed true motion display comprises a plurality of P.P.I. pictures, each corresponding to a different one of said derived sets of information, with the origin of the picture of the last derived set of information being located at a fixed predetermined point on said screen and the origins of the other pictures displayed at any given time being spaced from said predetermined point by respective amounts corresponding to and in directions opposite to the movement of the radar system during the time intervals required to derive the particular sets of information being displayed.

7. A radar system carried on board ship and comprising means for deriving, at a predetermined low periodicity, a succession of sets of information, each set being of information as to the direction and distance of radio reflecting targets within the range of the system; a plurality of information storage means; means for cyclically storing a sequence of said derived sets in said information storage means with a different sequential set stored in each storage means; means for taking off, at a cyclic speed of repetition which is high relative to the first-mentioned low periodicity, the sets of information stored at any given time in said information storage means; means for producing D.C. signals representative of mutually perpendicular components of ship's motion during the deriving of the succession of sets of information; condenser storage means for storing said D.C. signals; means including a final display cathode ray tube for utilizing the sets of information taken off to produce a final display of the P.P.I. type; and means for utilizing the D.C. signals stored in said condenser storage means for shifting the origin of the display in the final display tube in corresponding perpendicular component directions of such sense that the origin of the display of the last derived stored set of information is always located at the center of the screen, but the origins of the displays of earlier derived sets are moved back in correspondence with ship's movements which have occurred since the deriving of said earlier derived sets and prior to the deriving of said last derived set.

References Cited by the Examiner
UNITED STATES PATENTS

| 2,716,203 | 8/55 | Sen et al. | 343—11 |
| 2,822,536 | 2/58 | Sandretto | 343—11 |
| 2,956,274 | 10/60 | Smythe | 343—11 |

CHESTER L. JUSTUS, *Primary Examiner.*